(12) United States Patent
Kim et al.

(10) Patent No.: US 9,182,876 B2
(45) Date of Patent: Nov. 10, 2015

(54) METHOD ARRANGING USER INTERFACE OBJECTS IN TOUCH SCREEN PORTABLE TERMINAL AND APPARATUS THEREOF

(71) Applicant: Samsung Electronics Co., Ltd., Gyeonggi-do (KR)

(72) Inventors: Hyung-Gyu Kim, Gyeonggi-do (KR); Dae-Hyun Ji, Gyeonggi-do (KR); Joon-Woo Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 194 days.

(21) Appl. No.: 13/657,280

(22) Filed: Oct. 22, 2012

(65) Prior Publication Data

US 2013/0111384 A1    May 2, 2013

(30) Foreign Application Priority Data

Oct. 27, 2011    (KR) .......................... 10-2011-0110534

(51) Int. Cl.
| | | |
|---|---|---|
| *G06F 3/048* | (2013.01) | |
| *G06F 3/0481* | (2013.01) | |
| *G06F 3/0346* | (2013.01) | |
| *G06F 3/0488* | (2013.01) | |
| *G06F 1/16* | (2006.01) | |

(52) U.S. Cl.
CPC .............. *G06F 3/048* (2013.01); *G06F 3/0346* (2013.01); *G06F 3/04817* (2013.01); *G06F 3/04886* (2013.01); *G06F 1/1626* (2013.01); *G06F 2200/1637* (2013.01)

(58) Field of Classification Search
None
See application file for complete search history.

(56) References Cited

U.S. PATENT DOCUMENTS

| | | | | |
|---|---|---|---|---|
| 2006/0116203 | A1* | 6/2006 | Nakada et al. | 463/30 |
| 2008/0246778 | A1* | 10/2008 | Ham et al. | 345/646 |
| 2009/0140997 | A1 | 6/2009 | Jeong et al. | |
| 2009/0265671 | A1* | 10/2009 | Sachs et al. | 715/863 |
| 2010/0013780 | A1* | 1/2010 | Ikeda et al. | 345/173 |
| 2010/0070926 | A1* | 3/2010 | Abanami et al. | 715/835 |
| 2010/0131904 | A1* | 5/2010 | Fong et al. | 715/863 |
| 2010/0271331 | A1* | 10/2010 | Alameh et al. | 345/175 |
| 2010/0295958 | A1* | 11/2010 | Larsson et al. | 348/222.1 |
| 2011/0265046 | A1* | 10/2011 | Hinckley | 715/863 |
| 2012/0132746 | A1* | 5/2012 | Sizelove | 244/118.6 |
| 2012/0324381 | A1* | 12/2012 | Cohen et al. | 715/765 |

FOREIGN PATENT DOCUMENTS

KR    10-2009-0058073 A    6/2009

* cited by examiner

*Primary Examiner* — Matt Kim
*Assistant Examiner* — Hua Lu
(74) *Attorney, Agent, or Firm* — Cha & Reiter, LLC.

(57) ABSTRACT

A method of rearranging a display of at least one icon on a touch screen of a portable electronic device is provided. The method detects if the device has entered a tilted state, and automatically rearranges the display of the at least one icon according to the tilted state. In some implementations, icons are rearranged to be displayed in a lopsided manner when entering the tilted state, thereby facilitating user touch selection of the icons.

17 Claims, 11 Drawing Sheets

(a)          (b)

METHOD ARRANGING USER INTERFACE OBJECTS IN TOUCH SCREEN PORTABLE TERMINAL AND APPARATUS THEREOF

CLAIM OF PRIORITY

This application claims the benefit under 35 U.S.C. §119(a) of a Korean patent application filed in the Korean Intellectual Property Office on Oct. 27, 2011 and assigned Serial No. 10-2011-0110534, the entire disclosure of which is hereby incorporated by reference.

BACKGROUND

1. Technical Field

The present disclosure relates generally to portable electronic devices and user interfaces thereof, and more particularly, to a method and apparatus for arranging user interface objects in a touch screen portable device.

2. Description of the Related Art

With the rapid developments in electronics and telecommunications in recent years, portable (i.e., handheld) electronic devices such as mobile terminals, smart phones, game devices, electronics organizers, Personal Digital Assistants (PDAs), etc., have become increasingly popular. Portable terminals in some cases have become necessities of modern life as important means for delivering information which changes rapidly.

Recently, with the widespread use of touch screen portable devices based on a Graphic User Interface (GUI), designs have focused on improving user interfaces and facilitating user input. Touch screen devices typically display a plurality of user selectable objects on a main screen. A user can execute a task associated with an object via touch contact on the object to thereby select it. The user interface object may be an icon which allows a representatively loaded program to be executed to carry out a function, initiate an application program, etc.

As touch screen devices have proliferated, new designs with relatively larger touch screens have been introduced. With the advantage of a large screen, these devices have become increasingly popular. However, they exhibit a drawback when a user attempts to select objects using his/her thumb. For instance, if the user is holding the device with one hand and attempts to select icons using the thumb of that hand, it may be difficult to reach icons located across the entire screen furthest from the thumb position.

SUMMARY

An aspect of the present invention is to solve at least the above-mentioned problems and/or disadvantages and to provide at least the advantages described below. Accordingly, an aspect of the present invention is to provide a method and apparatus for arranging icons on a touch screen portable electronic device to positions easily touch-selectable by a user.

Another aspect of the present invention is to provide a method and apparatus for arranging icons lopsidedly when a touch screen portable device is tilted with respect to a normal viewing position.

In accordance with an aspect of the present invention, a method of rearranging a display of at least one icon on a touch screen of a portable electronic device is provided. The method detects if the device has entered a tilted state, and automatically rearranges the display of the at least one icon according to the tilted state. In some implementations, the display of icons is rearranged from a symmetrical, evenly distributed arrangement when the device is in a non-tilted state, to a lopsided arrangement when the device orientation changes to the tilted state, thereby facilitating user touch selection of the icons.

In an exemplary embodiment, an apparatus for rearranging at least one icon in a portable electronic device is provided. The apparatus includes a touch screen to display the at least one icon and to provide signals corresponding to touch events. A detector detects a tilt of the device, and a controller is configured to automatically rearrange the display of the at least one icon if a change from a non-tilted state to a tilted state is detected.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

Exemplary embodiments of the present invention will be described herein below with reference to the accompanying drawings. In the following description, well-known functions or constructions are not described in detail since they would obscure the invention in unnecessary detail. Also, terms used herein should be understood in the context of the description of the exemplary embodiments Terms used may vary depending on user or operator intention and usage.

Embodiments described herein provide a method and apparatus for arranging a user interface object to a position easily manipulated by a user in a touch screen portable device. According to one embodiment of the present invention, user interface objects can be arranged lopsidedly when the touch screen portable device is inclined.

Figure 1:
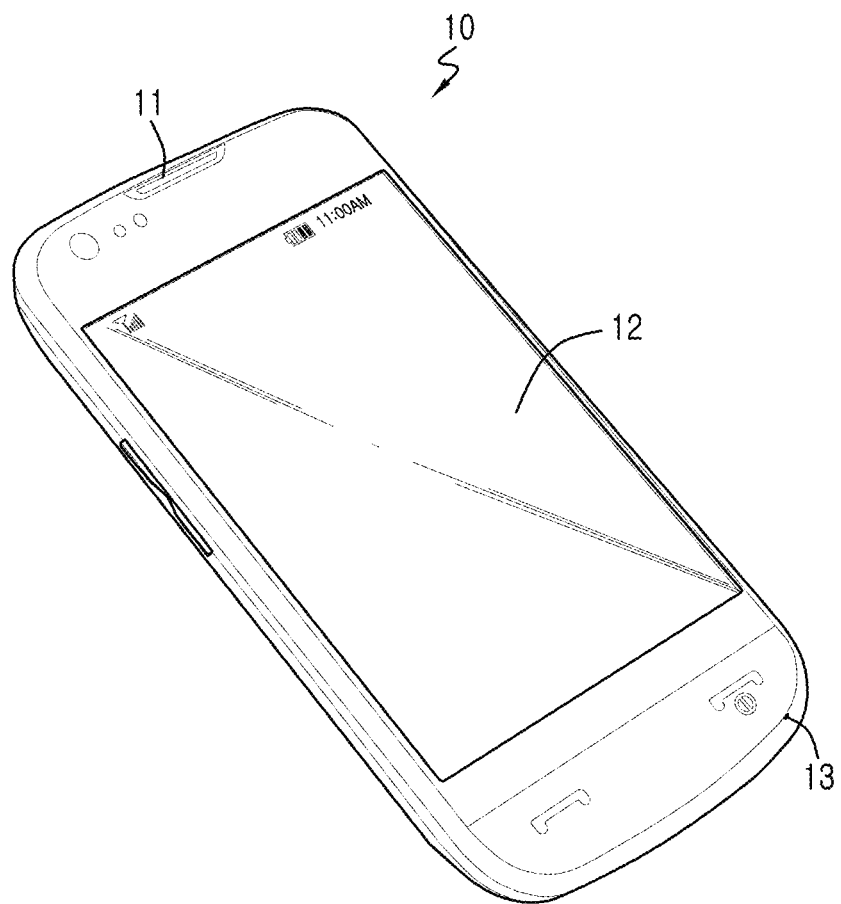
FIG. 1 is a perspective view of a touch screen portable device according to an exemplary embodiment of the present invention.

FIG. 1 is a perspective view of a touch screen portable electronic device, 10, according to an exemplary embodiment of the present invention. Portable device 10 includes a touch screen 12 for displaying images and receiving user inputs on the screen at locations of selectable icons based on touch. A speaker 11 outputs audio, and a microphone 13 converting an input audio signal into an electrical signal.

Further, the touch screen portable device 10 includes an acceleration sensor or a gyro sensor, and detects an inclination (i.e., a tilt) of the device using the sensor. For example, if a degree of tilt detected by the sensor exceeds a threshold, a controller within device 10 recognizes that the device has become inclined, i.e., has entered a tilted state, and controls the display accordingly, as will be described. Thus, the controller identifies a right side tilt in which a right side is lower than a left side, and a left side tilt in which the left side is lower than the right. Also, the controller identifies a upper side tilt in which a upper side is lower than a down side, and a down side tilt in which the down side is lower than the upper. In addition, the controller can recognize tilts greater than or equal to 90 degrees.

In particular, the touch screen portable device 10 rearranges icons (interchangeably, "user interface objects") displayed in the touch screen lopsidedly when the device 10 moves from a non-tilted state to a tilted state (i.e., when the device 10 enters a tilted state). An icon is an image or symbol used to represent a command for executing a task such as an application program, a function, etc. The lopsided display, in which the icons are preferably rearranged towards the right or left hand sides of the device 10, facilitates touch selection of the icons by a user, and in particular, by the user's thumb. A direction(s) of rearranging the icons lopsidedly may alternatively be downward or upward directions. The direction(s) may be set by the user and may be in the same direction irrespective of the tilt direction. For instance, a right handed user may pre-set the rearrangement direction such that whenever the device is detected in a left side tilt or right side tilt, the icons are shifted to the right.

Figure 2:
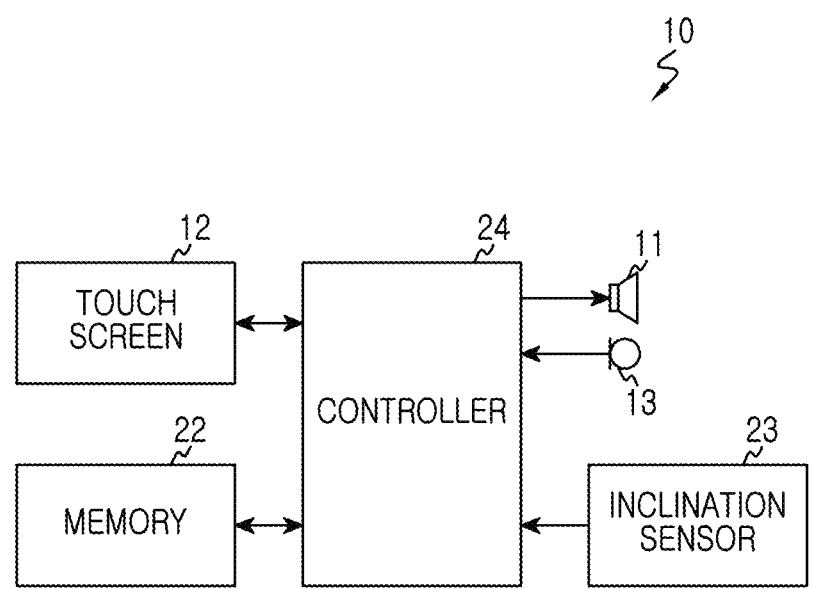
FIG. 2 is a block diagram illustrating a structure of a touch screen portable device according to an exemplary embodiment of the present invention.

FIG. 2 is a block diagram illustrating an example structure of the touch screen portable device 10, according to an exemplary embodiment of the present invention. Device 10 includes speaker 11, a microphone 13, touch screen 12, a memory 22, an inclination sensor 23, and a controller 24.

The touch screen 12 operates to provide input signals corresponding to touch events on the screen surface, and displays images and icons under the control of the controller 24.

The inclination sensor 23 detects a tilt of the touch screen portable device 10, and reports the detected tilt to the controller 24. According to the tilt provided from the inclination sensor 23, the controller 24 identifies that device 10 is inclined, i.e., is in a tilted state, or, if device 10 is in a non-tilted state. For example, if the tilt exceeds a threshold, the controller 24 recognizes that the device is in the tilted state. With this recognition, controller 24 can also recognize whether the tilted state is a right side tilt ((right side is lower than the left side) or a left side tilt (left side lower than the right side). The controller 24 can also recognize tilts greater than or equal to 90 degrees and control the display of icons accordingly in some implementations. The controller 24 can also distinguish an intentional tilt from a 90 degree rotation in some applications, such as a virtual keyboard application. That is, in some applications, the controller 24 may implement a different operation than that for a tilted state if it is determined that a 90 degree rotation has occurred within a predetermined tolerance range.

The memory 22 stores a specific program for controlling an overall operation of device 10, and stores a variety of data which is input and output when a control operation of the device is performed.

The controller 24 configures an environment of executing the device 10, maintains information thereof, allows the device to be reliably driven, and facilitates data input/output exchange of all elements of the device. The controller 24 includes a codec (not shown) for exchanging signals for images and audio using the touch screen 21, the speaker 11, and the microphone 13.

In particular, by using the tilt provided from the inclination sensor 23, the controller 24 identifies that the device 10 is inclined such that one side is lower than the other side, and controls the display of icons to be arranged lopsidedly. The direction in which the icons are shifted can be either set via default, or via user selection in a settings menu or the like.

The user can be given a number of different selection options as to how the icons are to be shifted when the device 10 enters a tilted state. Example selection options are as follows (where a right tilt results in the right side lower than the left side; and a left tilt results in the left side lower than the right side):

Ambidextrous I: the icons are shifted right when the device is tilted to the right, and the icons are shifted left when the device is tilted to the left. This option is also a typical default option.

Right-Handed—the icons are shifted to the right whenever the device is tilted to the right side or to the left side.

Left-Handed—the icons are shifted to the left whenever the device is tilted right or left.

Ambidextrous II: the icons are shifted right when the device is tilted left, and the icons are shifted left when the device is tilted right. This option is desirable for some users.

Right/Right—the icons are shifted to the right whenever the device is tilted right, but the icons remain in their original positions when the device is tilted left.

Left/Left—the icons are shifted to the left whenever the device is tilted left, but the icons remain in their original positions when the device is tilted right.

Other user selectable or default options can also be included, such as options to shift the icons higher or lower in response to a right and/or left tilt, or options to rearrange icons when the device is tilted in different planes such as the YZ plane discussed later.

It is noted that device 10 can also include a selection mode in which "tilt option" can be turned off, i.e., when the user does not desire rearrangement of icons in response to the device tilting, the user may turn the option off.

For example, in the "Ambidextrous I" option, when the device is held in the right hand and the user desires to manipulate icons via his/her thumb, the icons are preferably arranged in the right side, that is a side close in distance to the thumb of the right hand. On the contrary, when the device is held in the left hand, the icons are preferably arranged in the left side, that is a side close in distance to the thumb of the left hand. This option is useful for both lefties and righties as well as ambidextrous users.

Hereinafter, a method of arranging user interface objects by the controller 24 according to the present invention will be described with reference to the accompanied drawings.

Figure 3:
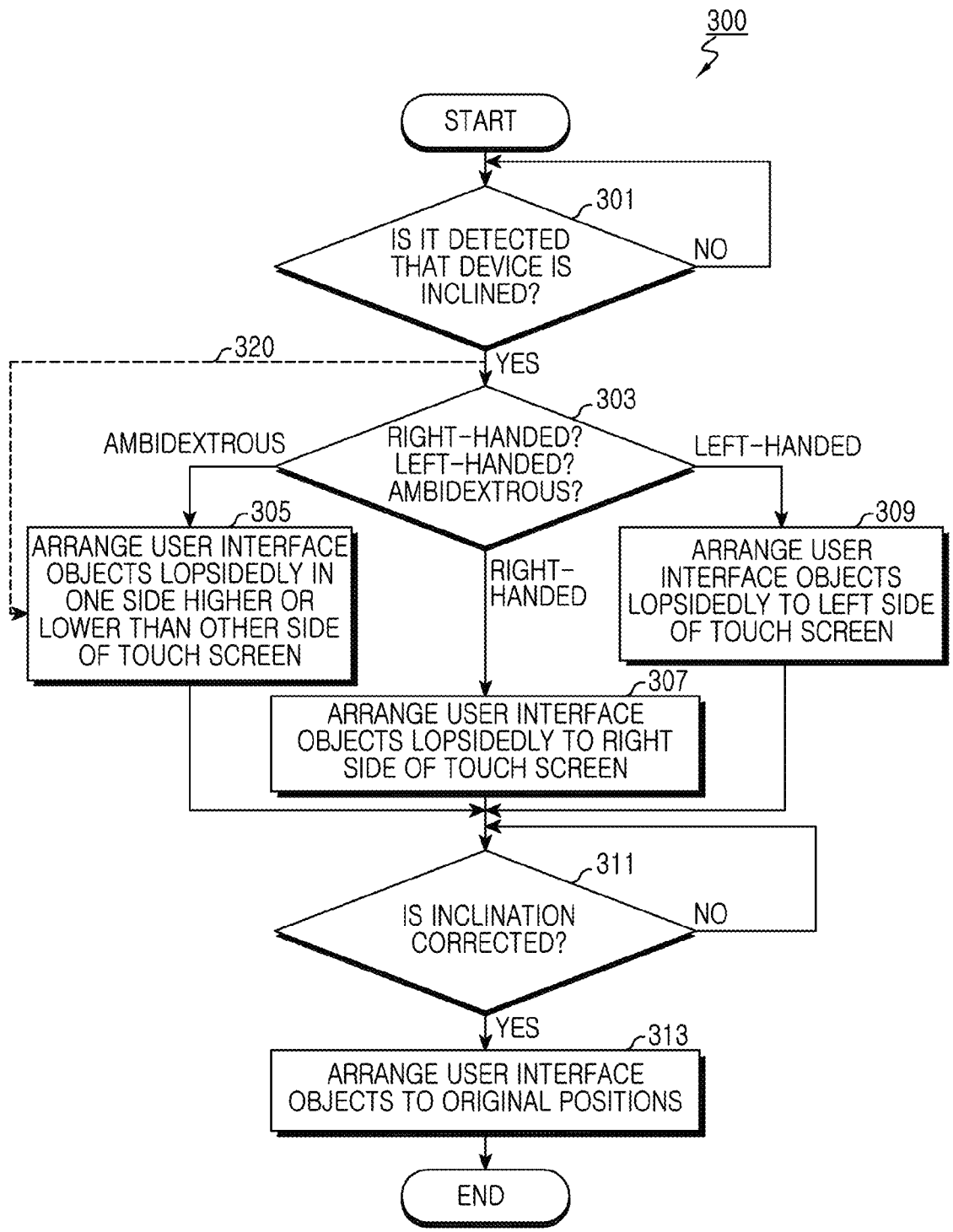
FIG. 3 is a flowchart illustrating a process of arranging user interface objects in a touch screen portable device according to an exemplary embodiment of the present invention.

FIG. 3 is a flowchart illustrating a process of arranging user interface objects in a touch screen portable device according to an exemplary embodiment of the present invention. The controller 24 determines whether the device is inclined (tilted) such that one side is lower than the other side in step 301. As described above, if a tilt provided from the inclination sensor 23 exceeds a threshold, the controller 24 identifies that the device is tilted. Accordingly, the controller 24 identifies a tilted state of the device 10 as one in which the right side is lower than the left side, or vice versa. Controller 24 identifies the device state as non-tilted if the tilt is less than the threshold, in which no rearrangement of icons takes place (i.e., the NO result in step 301).

If the device is tilted as determined in step 301 and the device is set to a default Ambidextrous option, which is indicated by path 320, the process proceeds to step 305. At step 305, the controller 24 provides control such that icons are arranged lopsidedly to one side lower than the other side (corresponding to the Ambidextrous I option discussed above). Alternatively, the icons are arranged lopsidedly to one side higher than the other side (corresponding to the Ambidextrous II option discussed above). For example, in a case where the device is held in the left hand and tilted left (inclined such that a left side is lower than a right side), the controller 24 provides control such that the icons are arranged lopsidedly to the left side of the touch screen in the Ambidextrous I selection option. Alternatively, in the Ambidextrous II option, in the case where the device is tilted right (inclined such that the right side is lower than the left side), the controller 24 controls the touch screen display such that the icons are arranged lopsidedly to the left side of the touch screen. The user can predetermine one of the two methods.

If a tilt is detected at step 301 and the device is not set to a default Ambidextrous setting, the process proceeds to step 303 where it is determined which of "Right-Handed", "Left-Handed" or "Ambidextrous" options has been selected.

When "Right-Handed" is determined, the controller 24 controls the display of icons such that the icons are arranged lopsidedly to the right side of the touch screen in step 307. Further, when "Left-Handed" is determined, the controller 24 provides control such that the icons are arranged lopsidedly to the left side of the touch screen in step 309. As described above, when either of the "Right-handed" or the "Left-Handed" option is determined, the controller 24 controls the display of icons to be arranged lopsidedly in a predetermined direction irrespective of the tilt direction.

When the controller 24 detects that the inclination is corrected in step 311 (i.e., the device is no longer tilted), the icons are restored to original positions in step 313. When the tilt provided from the inclination sensor 23 is less than or equal to the threshold, the controller 24 determines that the inclination is corrected.

If an icon is selected by the user via a touch event, the controller 24 may take a step of switching to a screen for a corresponding operation between the step 307 and the step 311. Since a main purpose of at least some embodiments the present invention is to arrange the user interface objects lopsidedly to facilitate a touch of the user, a description on a step for executing an operation of a corresponding user interface object will be omitted.

FIGS. 4A-4D illustrate touch screens in which icons are arranged lopsidedly according to exemplary embodiments of the present invention.

Figure 4A:
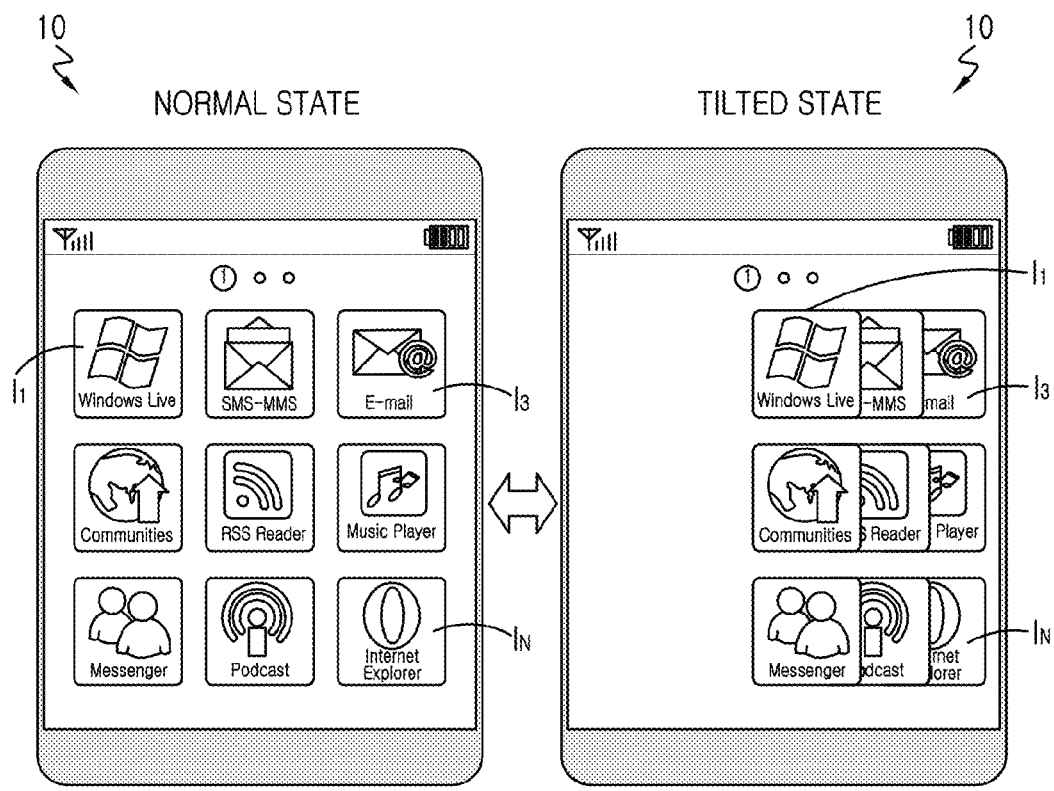
FIGS. 4A-4D illustrate touch screens in which icons are arranged lopsidedly according to exemplary embodiments of the present invention.
Figure 4A:
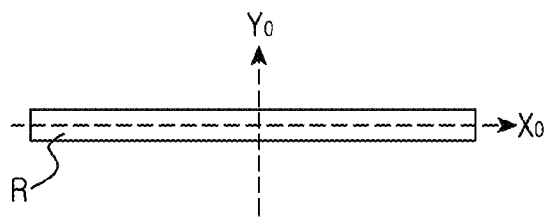
Figure 4A:
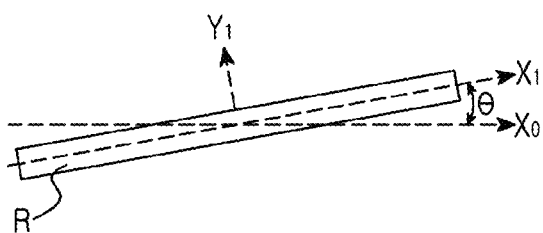

Referring to FIG. 4A, a portable electronic device 10 is shown in a normal (non-tilted) orientation state in screen (a) on the left hand side. An imaginary reference bar R is shown beneath the device 10 for purposes of illustration to designate the orientation of the device 10 shown directly above. Imaginary bar R runs parallel to the upper and lower sides of the device 10. (Imaginary bar R is used for this purpose in the various screen examples of FIGS. 5-8 as well as in FIGS. 4A-4D). The upper and lower sides of device 10 are the shorter sides for a generally rectangular device 10, as shown. In the non-tilted state, the device 10 is oriented with major axes X and Y of the touch screen surface (discussed below) in directions of Xo and Yo. In the non-tilted state, a plurality of icons $I_1$ to $I_N$ are displayed on the device touch screen in a generally symmetrical and evenly distributed manner. When the device 10 is tilted to the left hand side (tilted left) to enter the tilted state as illustrated in screen (b), the controller 24 controls the display such that the icons are shifted to the right, i.e., they are rearranged to be displayed lopsidedly in the touch screen. This example corresponds to either one of the Right-Handed or Ambidextrous II options described earlier.

Figure 4B:
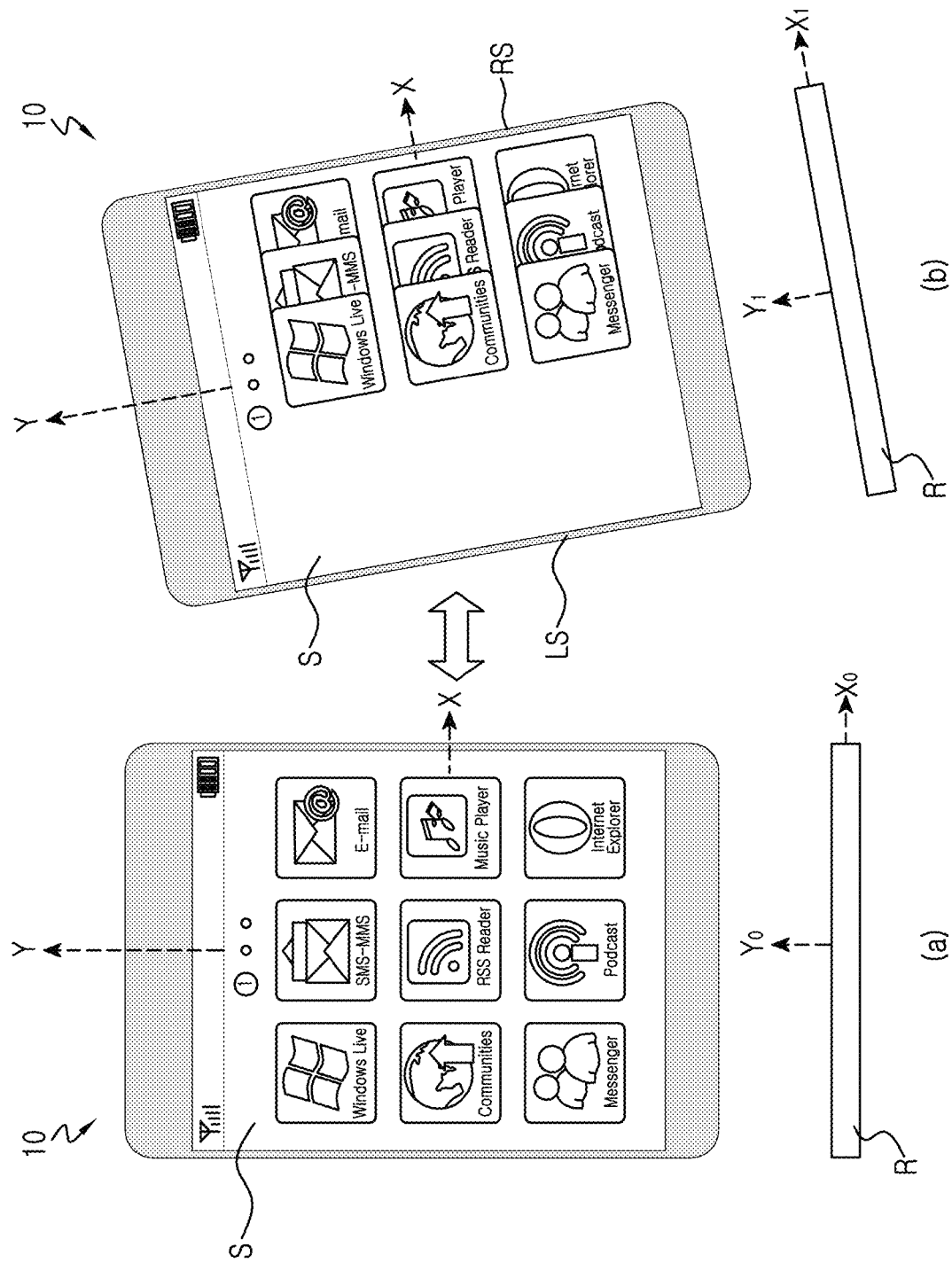

For clarity of illustration, although the device 10 is understood to be tilted in screen (b) of FIG. 4A by virtue of the tilt of reference bar R directly below, the device 10 is shown in the same orientation as that of the normal state. The actual tilted state for the example of FIG. 4A is illustrated in FIG. 4B, screen (b). Referring collectively to FIGS. 4A and 4B, the device 10 in this example is generally rectangular with a surface S that can be flat or curved. Alternative shapes such as oval or square shapes are also possible. Whatever the shape embodied, the surface S or a major portion thereof can be considered planar or substantially planar and defined by two major axis X and Y which are orthogonal or substantially orthogonal. A Z axis of the device 10 runs perpendicular to the X and Y axes (into and out of the paper in the illustration). When the device is held vertically, the Y axis is vertical and the X axis is horizontal, and point in the respective directions of axes Yo and Xo. In the tilted state of the various examples, the X and Y axes point in the direction of axes X1 and Y1, where X1 is offset from Xo by an angle θ, and Y1 is offset from Yo by θ. Thus the tilt is considered to occur in the XY plane. That is, left and right tilts denote tilts of the XY plane of the surface S leftward and rightward, respectively. As discussed earlier, when θ exceeds a predetermined threshold, the device 10 is considered to be in a tilted state.

However, device 10 is, in practice, often operated while tilted slightly in the YZ plane, and may occasionally be operated while laid flat on a horizontal surface. Controller 24, in conjunction with inclination sensor 23, can be configured to detect left and right tilts even when the device 10 starts out tilted in the YZ plane. Further, the tilting operation need not be precisely along the XY plane; as long as at least a minimum component of the tilt occurs in the XY plane, a left or right tilt is detectable by the sensor 23. In an optional design, when the device 10 starts out laying on a flat surface such that both the X and Y axes of surface S point horizontally, if a tilt in the XY plane thereafter rapidly occurs, it could be recognized as a suitable tilt to cause rearrangement of icons. With the device 10 operated horizontally, embodiments can be configured to distinguish between normal rotations and intentional left-right tilts as a function of the speed of the rotation motion.

Further, if the device 10 is operated initially on a horizontal surface such that both the X and Y axes are oriented horizontally or substantially horizontally, if a tilt occurs in the XZ plane, sensor 23 and controller 24 can be configured to detect this tilt as a right tilt or a left tilt, as the case may be, whereby the icons are rearranged according to the tilt state, in accordance with the user selected options or default options described above.

Figure 4C:
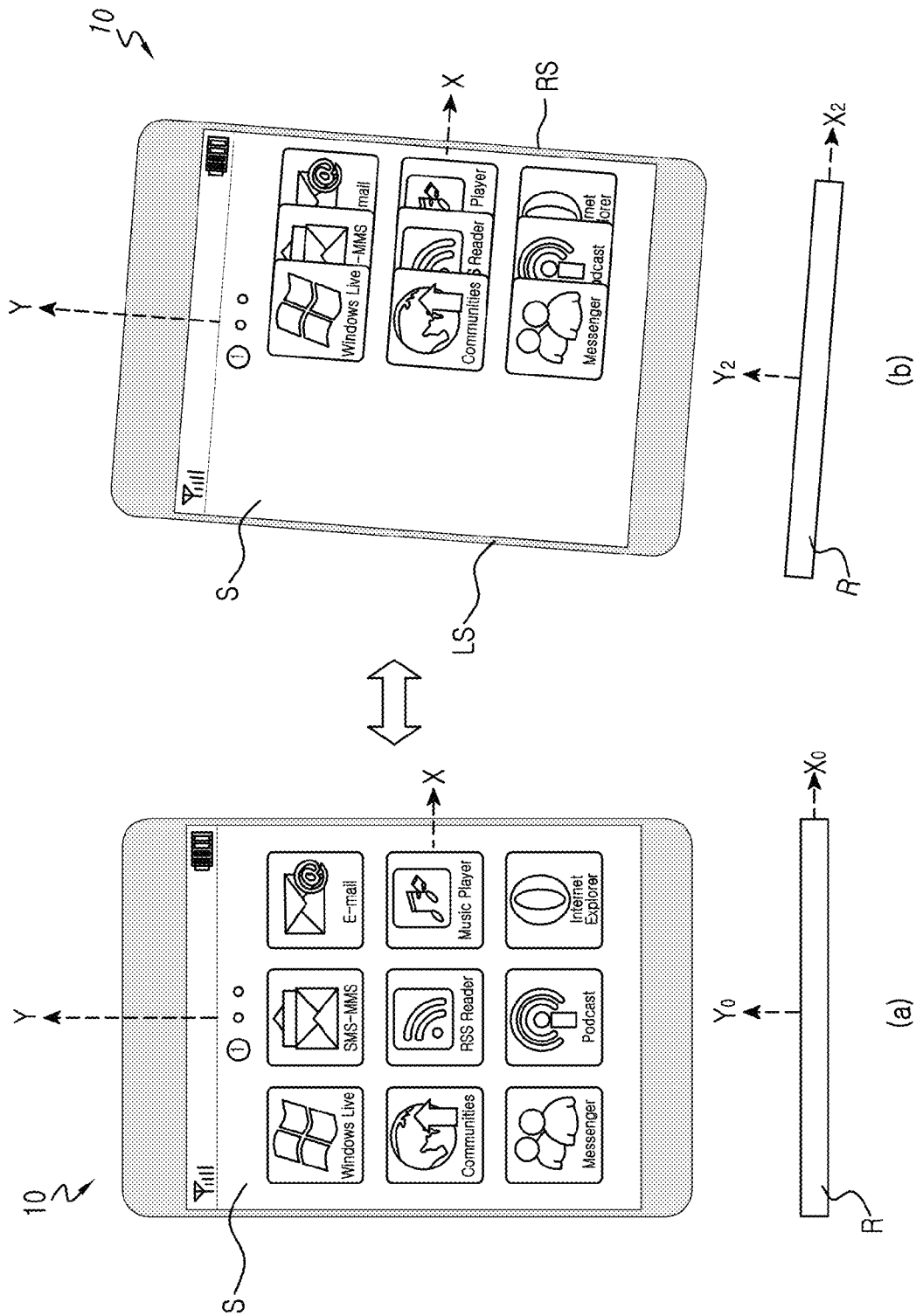

FIG. 4C illustrates a case in which the device 10 is tilted right. In this example, the icons are shifted to the right, which occurs in either of the Right-Handed or Ambidextrous I options described above. With the right tilt, a right side RS of device 10 becomes lower than the left side LS, and vice versa for a left tilt as shown in FIG. 4B (both cases referenced to a generally vertical orientation in the normal state).

Figure 4D:
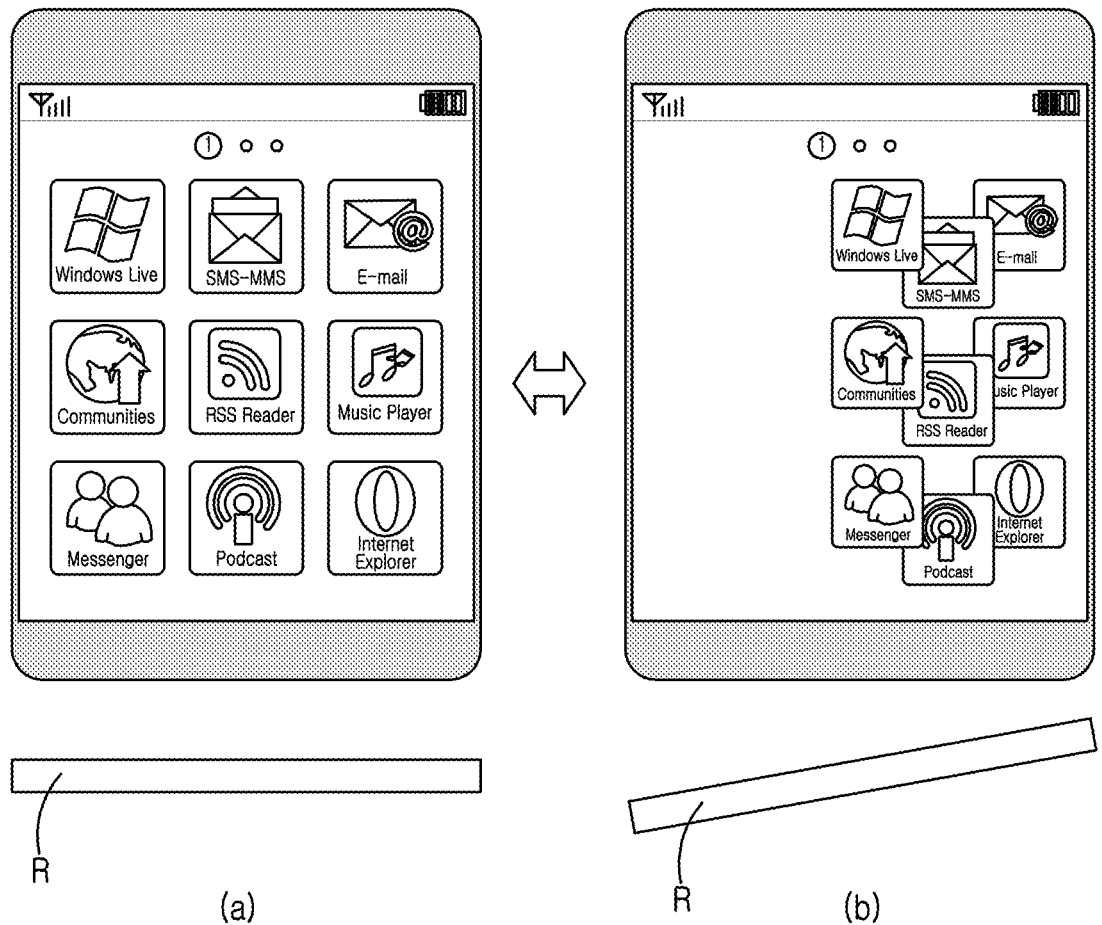

The icons can be arranged lopsidedly in the touch screen by using any one of a method of arranging the icons by decreasing sizes of the icons, a method of arranging the icons in an overlapping manner, and a method of arranging the icons in a zigzag manner or by using a combination of these methods. FIGS. 4A-4C illustrate the overlapping method. FIG. 4D illustrates a combination of arranging icons in a zigzag manner and with reduced sizes.

Figure 5:
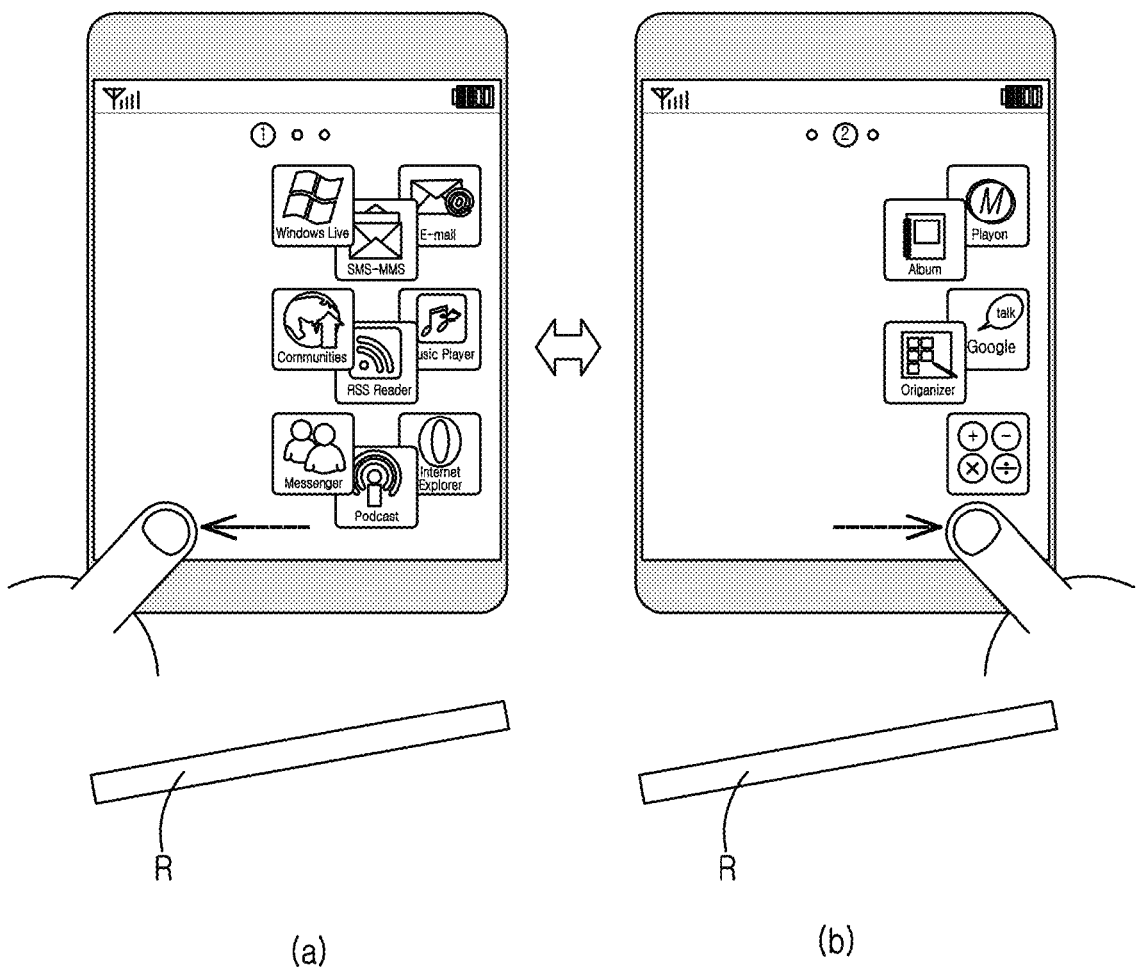
FIG. 5 illustrates a page change in a touch screen in which icons are arranged lopsidedly according to an exemplary embodiment of the present invention.

FIG. 5 illustrates icon page scrolling in a touch screen in which icons are arranged lopsidedly according to an exemplary embodiment of the present invention. As illustrated in screen (a), when a portable device is tilted left or right such that one side is lower than the other side, the controller 24 has already rearranged the display of such that icons are arranged lopsidedly in the touch screen. In this tilted state, if a touch event commanding a page change, e.g., a flicking touch, is detected, the controller 24 implements a scroll operation in which a current page changes to a previous or next page (screen (b)) and icons belonging to the changed page are arranged lopsidedly in the same manner as for the current page. Thus, if in the tilted state the icons of the current icon page are rearranged to the right, the icons of the new page will also be arranged to the right in response to the scroll command, in both cases of a scroll to a previous icon page or to a new icon page in an icon page sequence.

Figure 6:
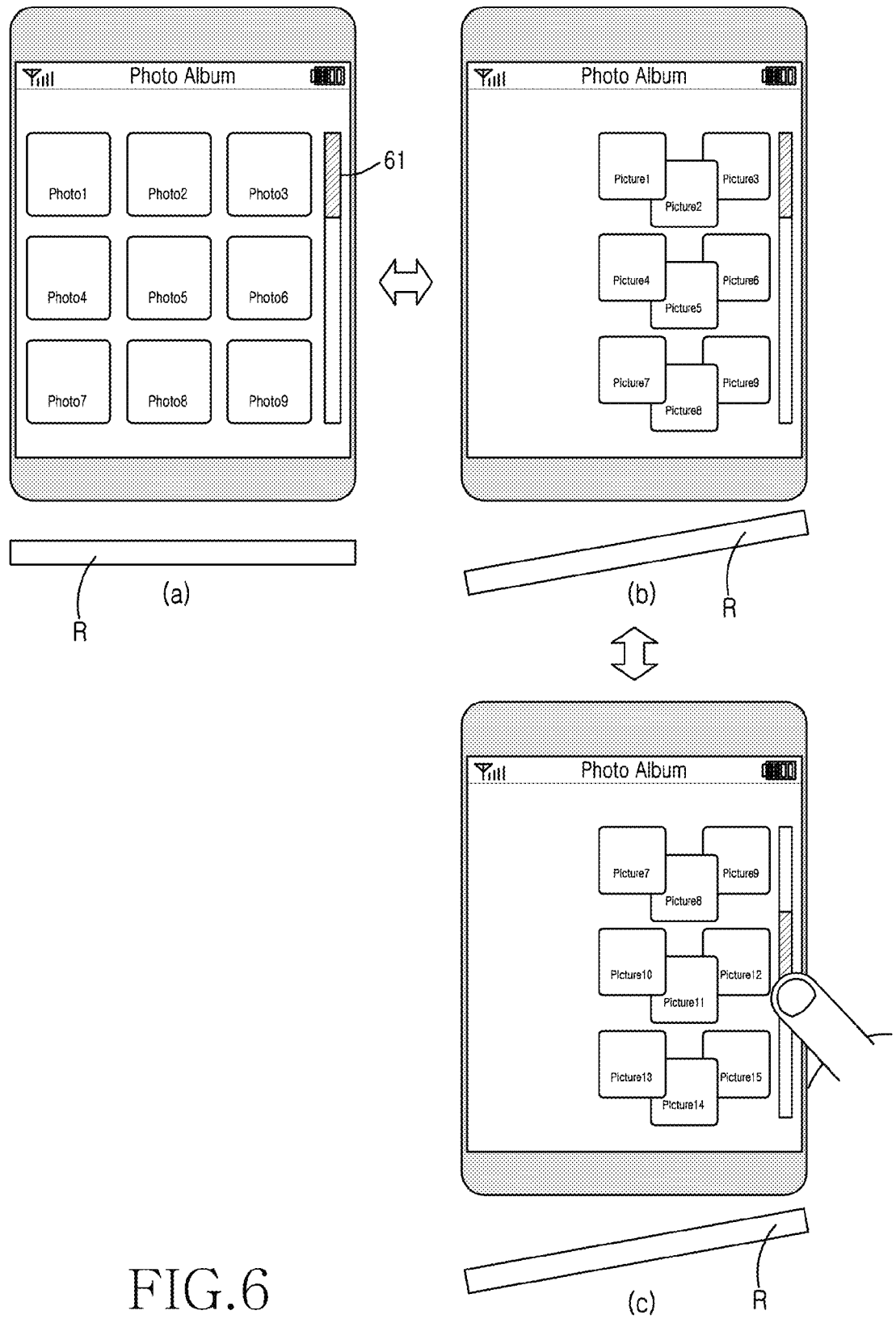
FIG. 6 illustrates a touch screen in which icons are arranged lopsidedly according to an exemplary embodiment of the present invention.

FIG. 6 illustrates a touch screen in which icons are arranged lopsidedly according to an exemplary embodiment of the present invention. The touch screen portable device provides a scroll bar 61 enabling a user to scroll through different sets of icons by moving the scroll bar upwards and downwards. When the portable device 10 is tilted such that one side is lower than the other side, the controller 24 provides control such that the scroll bar 61 and the icons are arranged lopsidedly, as illustrated in screen (b). If the user moves the scroll bar while the tilted state is maintained, the controller 24 controls the display such that a new set of icons, corresponding to a position to which the scroll bar is moved, are also arranged lopsidedly as shown in screen (c).

Figure 7:
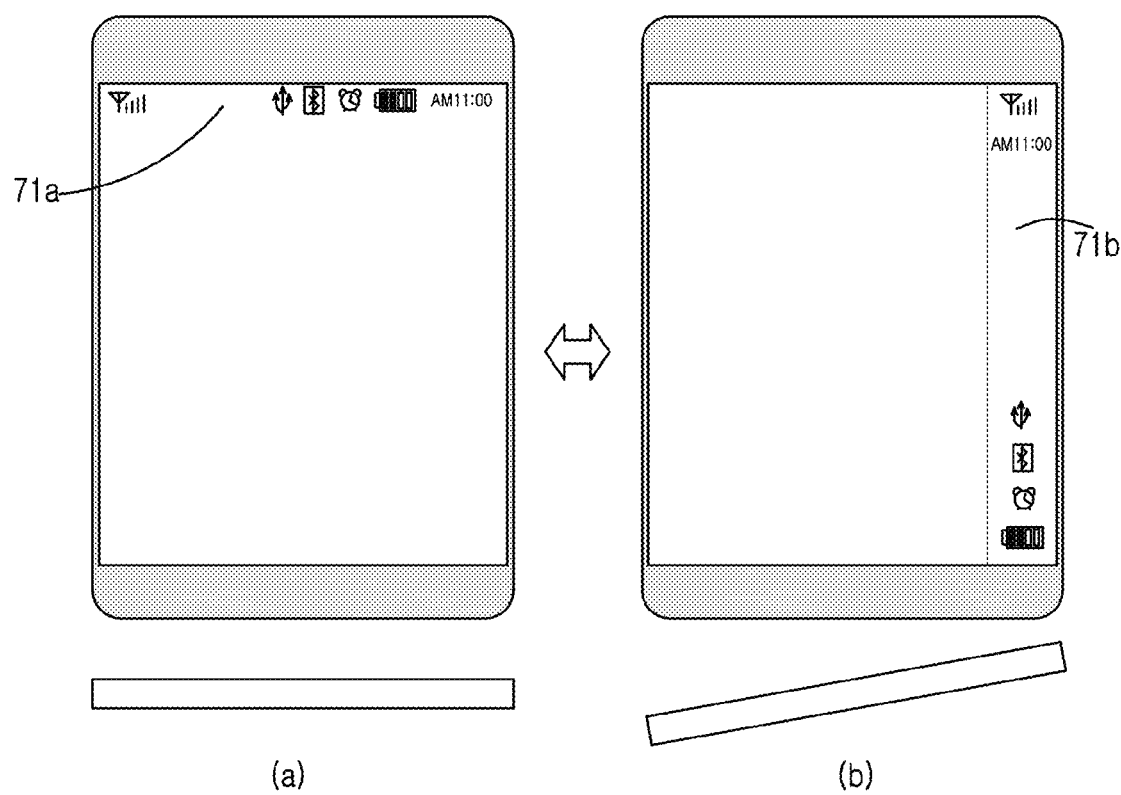
FIG. 7 illustrates a touch screen in which a status indication bar is arranged lopsidedly according to an exemplary embodiment of the present invention.

FIG. 7 illustrates rearranging a display of a status indication bar on a touch screen when a portable device moves from a non-tilted state to a tilted state, in accordance with an embodiment. As shown in screen (a), a horizontally oriented status bar 71a contains at least one but preferably a plurality of indicators that indicate respective statuses of the device, such as functions, battery charging, etc. When the device 10 changes from the non-tilted state to a tilted state, as shown in screen (b), the display of the status bar is rearranged as status bar 71b under the control of controller 24, to be displayed vertically and lopsidedly in accordance with the tilted state.

Figure 8:
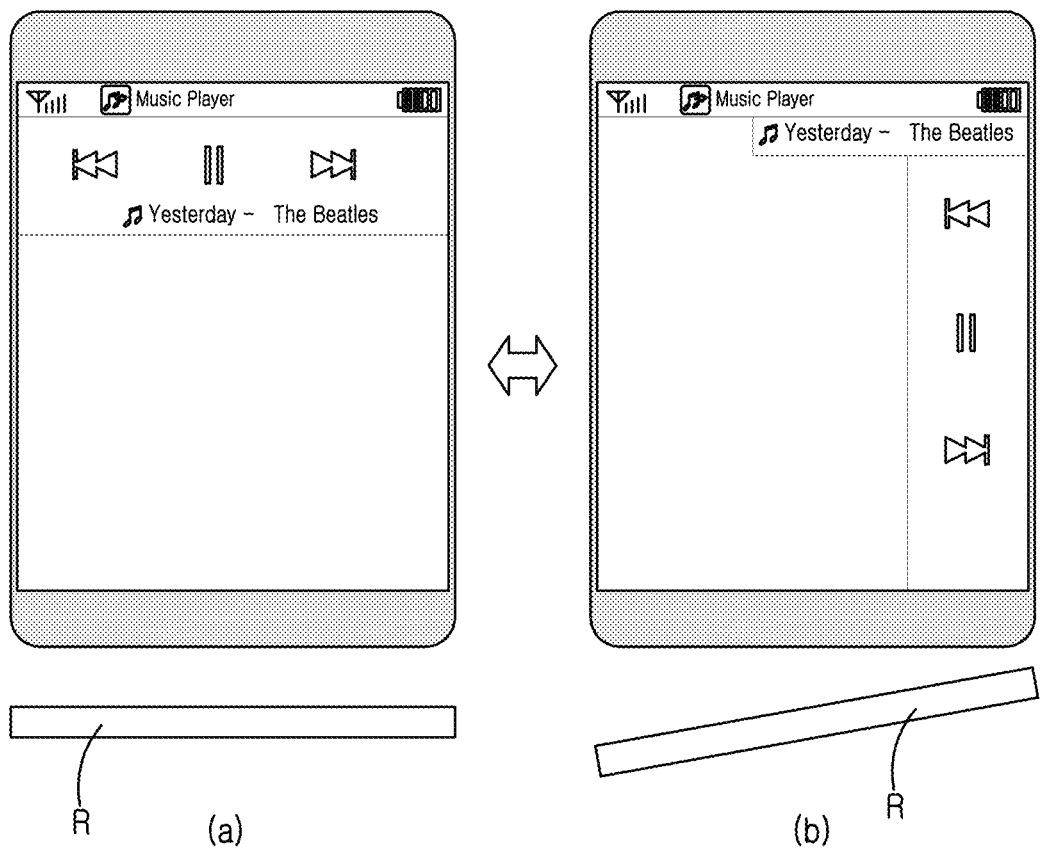
FIG. 8 illustrates a touch screen in which a keypad of an application program is arranged lopsidedly according to an exemplary embodiment of the present invention.

FIG. 8 illustrates rearranging a display of a virtual keypad on a touch screen when a portable device moves from a non-tilted state to a tilted state in accordance with an embodiment. In which a keypad of an application program is arranged lopsidedly according to an exemplary embodiment of the present invention. The keypad is specified for a corresponding application program, and constitutes a plurality of virtual keys. For example, a music player provides a keypad which constitutes keys for playback, stop, and pause.

Referring to FIG. 8, in a state where a keypad for a corresponding application program is placed horizontally in the touch screen, if the portable device is inclined such that one side is lower than the other side, the controller 24 provides control such that the keypad is arranged lopsidedly in the touch screen by reconfiguring at least one key (but preferably a plurality of keys) included in the keypad to be placed vertically responsive to detecting that the device 10 has entered the tilted state.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

In conclusion, according to a method and apparatus for arranging user interface objects in a touch screen portable device, the user interface objects (icons) are arranged lopsidedly when the portable device is inclined, and thus a user can easily select the user interface objects with one hand which grabs the touch screen portable device.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method of rearranging a display of a touch screen of a portable electronic device, the method comprising:
    detecting a tilt of the device;
    identifying whether the device is configured for a right-handed user, left-handed user, or ambidextrous user;
    when the device is configured for the right-handed user, rearranging icons such that the icons are disproportionally arranged on a right side of the touch screen irrespective of a leftward or rightward direction of the tilt relative to a vertical axis;
    when the device is configured for the left-handed user, rearranging the icons such that the icons are disproportionally arranged on a left side of the touch screen irrespective of the leftward or rightward direction of the tilt; and
    when the device is configured for the ambidextrous user, rearranging the icons such that the icons are disproportionally arranged to a default side of the touch screen, according to the leftward or rightward direction of the tilt.

2. The method of claim 1, wherein the tilt is detected when the tilt exceeds a threshold.

3. The method of claim 1, wherein predefined settings configure the portable electronic device for the right-handed user, the left-handed user, or the ambidextrous user.

4. The method of claim 1, further comprising:
in response to detecting a scrolling command, scrolling a current icon page, in which the icons have been rearranged in response to the tilt, to a different icon page such that the icons are rearranged in the different icon page as the icons were rearranged in the current icon page.

5. The method of claim 1, wherein rearranging the icons further comprises at least one of:
decreasing a size of an icon;
overlapping an icon with another icon; and
rearranging an icon to be displayed in a zigzag manner with respect to another icon.

6. The method of claim 1, further comprising:
displaying a status indication bar horizontally, the status indication bar indicating an operation status of the device; and
in response to detecting the tilt, rearranging the status indication bar to a vertical orientation.

7. The method of claim 1, further comprising:
displaying a virtual keypad with keys disposed horizontally; and
in response to detecting the tilt, rearranging the keypad vertically.

8. The method of claim 1, further comprising:
detecting whether the device has reverted to a normal state without tilt; and
when the device has reverted to the normal state without tilt, arranging the icons original positions on the touch screen.

9. A portable electronic device comprising:
a touch screen;
at least one processor to:
detect a tilt of the device;
identify whether the device is configured for a right-handed user, left-handed user, or ambidextrous user;
when the device is configured for the right-handed user, rearrange icons such that the icons are disproportionally arranged on a right side of the touch screen irrespective of a leftward or rightward direction of the tilt relative to a vertical axis;
when the device is configured for the left-handed user, rearrange the icons such that the icons are disproportionally arranged on a left side of the touch screen irrespective of the leftward or rightward direction of the tilt; and
when the device is configured for the ambidextrous user, rearrange the icons such that the icons are disproportionally arranged to a default side of the touch screen, according to the leftward or rightward direction of the tilt.

10. The portable electronic device of claim 9, wherein the at least one processor is configure to detect the tilt when the tilt exceeds a threshold.

11. The portable electronic device of claim 9, wherein the at least one processor is configured to read predefined settings in order to identify whether the device is configured for the right-handed user, the left-handed user, or the ambidextrous user.

12. The portable electronic device of claim 9, wherein the at least one processor is further configured to:
detect a scrolling command; and
in response to the scrolling command, scroll a current icon page, in which the icons have been rearranged in response to the tilt, to a different icon page such that the icons are rearranged in the different icon page as the icons were rearranged in the current icon page.

13. The portable electronic device of claim 9, wherein the at least one processor is further configured to:
decrease a size of an icon;
overlap an icon with another icon; and
rearrange an icon to be displayed in a zigzag manner with respect to another icon.

14. The portable electronic device of claim 9, wherein the at least one processor is further configured to:
display a status indication bar horizontally, the status indication bar indicating an operation status of the device; and
in response to detecting the tilt, rearrange the status indication bar to a vertical orientation.

15. The portable electronic device of claim 9, wherein the at least one processor is further configured to:
display a virtual keypad with keys disposed horizontally; and
in response to detecting the tilt, rearrange the keypad vertically.

16. The portable electronic device of claim 9, wherein the at least one processor is further configured to:
detect whether the device has reverted to a normal state without tilt; and
when the device has reverted to the normal state without tilt, arrange the icons to original positions on the touch screen.

17. A method of rearranging a display of a touch screen of a portable electronic device, the method comprising:
detecting a tilt of the device;
identifying whether the device is configured for a right-handed user, left-handed user, or ambidextrous user;
when the device is configured for the right-handed user, rearranging icons such that the icons are disproportionally arranged on a right side of the touch screen when the tilt is in a rightward direction relative to a vertical axis, and maintaining the icons in original positions when the tilt is in a leftward direction relative to the vertical axis;
when the device is configured for the left-handed user, rearranging the icons such that the icons are disproportionally arranged on the left side of the touch screen when the tilt is in the leftward direction and maintaining the icons in original positions when the tilt is in the rightward direction; and
when the device is configured for the ambidextrous user, rearranging the icons such that the icons are disproportionally arranged to a default side of the touch screen, according to the leftward or rightward direction of the tilt.

* * * * *